United States Patent [19]
Ben-Aissa et al.

[11] Patent Number: 5,558,274
[45] Date of Patent: Sep. 24, 1996

[54] DUAL DUCT CONTROL SYSTEM

[75] Inventors: M. Nebil Ben-Aissa, Tunisia, South Africa; Jerry J. Doran, Greendale, Wis.; Howard A. Jensen, Mequon, Wis.; Dick Monroe, West Milwaukee, Wis.

[73] Assignee: Johnson Service Company, Milwaukee, Wis.

[21] Appl. No.: 409,704

[22] Filed: Mar. 24, 1995

[51] Int. Cl.⁶ ................................................. G05D 23/00
[52] U.S. Cl. .............................. 236/13; 236/49.3; 165/259
[58] Field of Search ...................... 236/13, 49.3; 165/26, 165/27, 16

[56] References Cited

U.S. PATENT DOCUMENTS 4,917,174 4/1990 Ring ........................................ 165/26
5,350,113 9/1994 Coogan ...................................... 236/13

*Primary Examiner*—John M. Sollecito
*Attorney, Agent, or Firm*—Harness, Dickey & Pierce, P.L.C.

[57] ABSTRACT

The present invention relates to a dual duct control system for use in an environmental control system. The dual duct control system is preferably utilized in a dual duct VAV box. The control system advantageously receives room temperature values, mixed air flow values, and positions the actuators in response to temperature values and flow values. The dual duct control system preferably executes a shower algorithm implemented in software to position the actuators. The shower algorithm provides a scheme for incrementally adjusting the hot and cold air flow setpoints for the VAV box so the internal environment reaches a comfortable temperature within a minimum amount of time.

18 Claims, 8 Drawing Sheets

| MIXED FLOW ERROR | INCREMENTAL HOT FLOW SETPOINT | INCREMENTAL COLD FLOW SETPOINT | MIXED TEMPERATURE ERROR |
|---|---|---|---|
| + | −<br>−<br>0 | 0<br>−<br>− | +<br>0<br>− |
| 0 | −<br>0<br>+ | +<br>0<br>− | +<br>0<br>− |
| − | 0<br>+<br>+ | +<br>+<br>0 | +<br>0<br>− |

FIG. 4

DUAL DUCT CONTROL SYSTEM

CROSS REFERENCE TO MICROFICHE APPENDIX A

This patent application references microfiche Appendix A attached hereto, having 157 frames and a header listing inventors Ben-Aissa et al. and the title "Dual Duct Control System."

NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

The present invention is related to an environmental control system. More particularly, the present invention is related to the control and operation of a dual duct device such as a dual duct VAV box.

Environment control networks or facility management systems are employed in office buildings, manufacturing facilities, and the like, for controlling the internal environment of the facility. The environment control network may be employed to control temperature, fluid flow, humidity, lighting, boilers, chillers, or security in the internal environment. A particular type of environmental control system is a dual duct HVAC system configured to control temperature and air flow in an internal environment. The dual duct HVAC system is generally comprised of dual duct controlled air units (e.g., variable air volume (VAV) boxes or unitary devices (UNT)) located throughout a facility. The VAV boxes provide environmentally controlled air to the internal environment. The controlled air is provided at a particular temperature or humidity so that a comfortable internal environment is established.

The dual duct VAV boxes or other unitary devices are coupled to an air source which separately supplies hot air and cold air to the VAV box via duct work. The hot air is provided by a hot air duct, and the cold air is provided by a cold air duct. VAV boxes and unitary devices may include a fan or other device for blowing the hot and cold air.

VAV boxes and unitary devices provide the hot and cold air through dampers (e.g., a hot air damper and a cold air damper). The dampers regulate the amount of the hot and cold air provided to the internal environment. The dampers are coupled to actuators which position the dampers so appropriate mixed air flow (the combination of the hot air flow and cold air flow) measured in cubic feet per minute (CFM) is provided to the internal environment. The dual duct VAV box provides the mixed air flow to the hallway, room, office, portion of a building or other internal environment.

A digital controller is generally associated with each dual duct VAV box or other device containing the hot air damper, the cold air damper and their associated actuators. The controller receives information related to the air flow and temperature in the internal environment and generates cold air flow setpoints and hot air flow setpoints. The controller appropriately positions the actuators in accordance with the setpoints so that the appropriate mixed air flow is provided to the internal environment. The controller may include sophisticated feedback mechanisms such as proportional integral derivative (PID) control algorithms. Sophisticated feedback mechanisms allow the actuators to be positioned more precisely.

Heretofore, the controller computed the set points for the hot and cold air flow in response to the measured room temperature. Sophisticated dual duct control algorithms employed within the controller continually reset and recalculate the hot and cold air flow setpoints in response to the measured room temperature. These conventional dual duct control algorithms are prone to hunting as the actuators are repositioned in accordance with newly calculated hot and cold air flow setpoints. Hunting often causes noise and air flow changes which can annoy the occupant. Hunting also excessively wears the actuators associated with the hot and cold air dampers.

Thus, there is a need for a dual duct control system which is not prone to hunting. Further, there is a need for a dual duct control system which accounts for the present cold air flow and hot air flow setpoints when calculating new setpoints. Further still, there is a need for a dual duct control system which measures the temperature of the mixed air and the flow of the mixed air and generates new setpoints in response to those measurements.

SUMMARY OF THE INVENTION

The present invention relates to an environmental control system including a first duct for providing hot air and a second duct for providing cold air. The system also includes a flow sensor circuit configured to determine the combined flow of the hot air and the cold air, and to provide a mixed flow signal representative of the combined flow and a temperature sensor configured to measure temperature of the combined flow and to provide a temperature signal representative of the temperature. The dual duct control system is comprised of a controller configured to individually control hot flow of the hot air provided by the first duct and to individually control cold flow of the cold air provided by the second duct. The controller increases and decreases the hot flow and the cold flow in response to the temperature signal and the mixed flow signal.

The present invention also relates to a method for controlling the environment with a system including a first unit for providing a first flow having a first quality and a second unit for providing a second flow having a second quality. The first flow and the second flow are provided to the environment so that a first parameter of the environment is within a preferred range. The first parameter is related to the first and second qualities. The method includes the steps of determining a combined flow of the first flow and the second flow, sensing a second parameter of the combined flow, the second parameter being related to the first parameter, increasing, decreasing or maintaining the first flow in response to the second parameter and the combined flow, increasing, decreasing or maintaining the second flow in response to the second parameter and the combined flow, and repeating the above steps to bring the first parameter within the preferred range.

The present invention also relates to a dual duct unit for use in an HVAC system. The dual duct unit includes a first duct for providing hot air to an environment, a second duct for providing cool air to the environment, a flow sensor means for determining combined flow of the hot air and the cool air, a temperature sensor means for determining temperature of the combined flow, and a control means for controlling a first amount of the hot air provided by the first duct and a second amount of the cool air provided by the second duct. The control means determines the first amount and the second amount in response to the temperature signal and the flow signal.

Aspects of the present invention advantageously reduce hunting associated with conventional dual duct control systems. The present invention preferably utilizes a shower algorithm to appropriately adjust the hot air flow and cold air flow. Preferably, the dual duct control system utilizes a microprocessor operating software to calculate incremental adjustments to the hot air flow and cold air flow in accordance with a look-up table or algebraic equation.

In another aspect of the invention, the dual duct control system determines the combined flow associated with the hot air duct and the cold air duct and the temperature of the combined flow to determine new flow setpoints for the hot air flow and the cold air flow. Preferably, the dual duct control system is implemented in a microprocessor for operating software configured as a shower algorithm. The shower algorithm can produce new flow setpoints in response to the room temperature, the temperature of the combined flow, the combined flow, and the previous flow setpoints to advantageously reduce hunting and quickly bring the internal environment to a particular temperature.

BRIEF DESCRIPTION OF THE DRAWINGS

The invention will hereafter be described with reference to the accompanying drawings, wherein like numerals denote like elements, and:

FIG. 4 is a block diagram illustrating the shower algorithm for use by the dual duct control system illustrated in FIGS. 3A-C.

DETAILED DESCRIPTION OF THE PREFERRED EXEMPLARY EMBODIMENT OF THE PRESENT INVENTION

Figure 1:
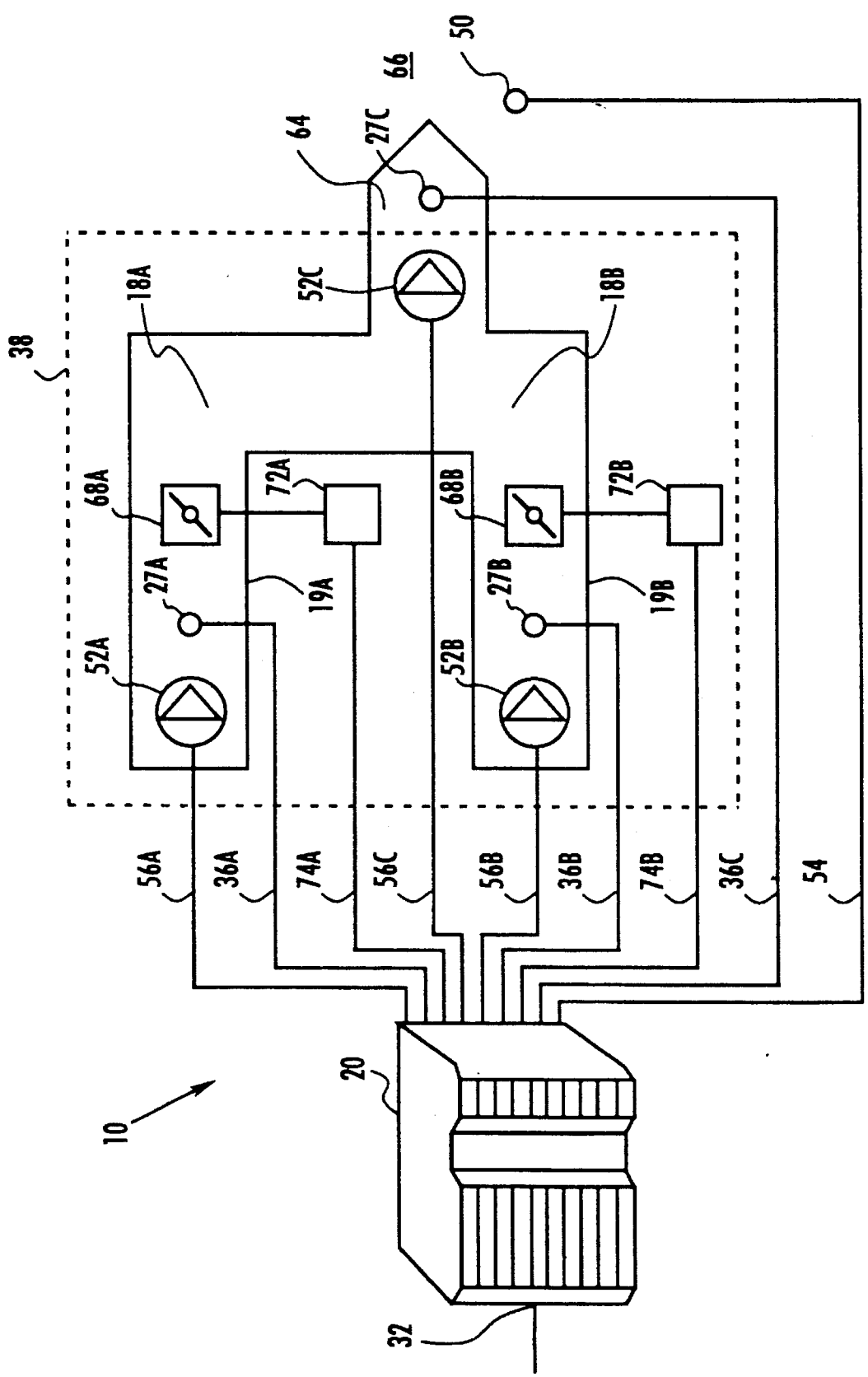
FIG. 1 is a simplified schematic block diagram of a dual duct VAV box and controller in accordance with a preferred exemplary embodiment of the present invention.

Referring to FIG. 1, an environment control system or network 10 includes at least one controller 20 and a unitary device or a dual duct VAV box 38. Controller 20 is coupled to communication bus 32. Preferably, environment control network 10 is a facilities management system such as the Metasys™ system as manufactured by Johnson Controls, Inc. (JCI) for use with at least one VAV box 38. Alternatively, network 10 can be a unitary system having roof-top units or other damper systems instead of VAV box 38.

Controller 20 is operatively associated with a controlled air unit such as VAV box 38. Controller 20 includes a hot air flow input 56A, a cold air flow input 56B, a mixed temperature input 36C, a room or zone temperature input 54, a hot actuator output 74A, and a cold actuator output 74B. Controller 20 may also be configured to include a hot temperature input 36A, a cold temperature input 36B, and a mixed flow input 56C. VAV box 38 may additionally include fans, heating or cooling units, exhaust dampers, and return dampers (not shown) for treating a combined air flow or mixed flow 64.

Controller 20 controls the amount of mixed flow 64 provided to an environment 66. Mixed flow 64 is a combination of a hot air flow 18A and a cold air flow 18B. Air flows 18A and 18B are provided by separate air sources (not shown) via ductwork (not shown) to VAV box 38. Inputs 56A-C, 36A-C, and 54 are preferably analog inputs received by an A/D converter (not shown) in controller 20. Controller 20 preferably includes circuitry and software for conditioning and interpreting the signals on inputs 36A-C, 56A-C and 54.

VAV box 38 includes a hot damper 68A disposed in a hot air duct 19A, a cold damper 68B disposed in a cold air duct 19B, a hot flow sensor 52A, a cold flow sensor 52B, and a mixed temperature sensor 27C. VAV box 38 can also be configured to include a hot temperature sensor 27A, a cold temperature sensor 27B, and a mixed flow sensor 52C. Actuators 72A-B are preferably EDA-2040™ motors manufactured by Johnson Controls, Inc. Actuators 72A-B position dampers 68A-B, respectively, in response to electric actuator control signals on actuator outputs 74A-B. Alternatively, actuators 72A-B and controller 20 may be pneumatic or any other type of devices for controlling and positioning dampers 68A-B.

The position of damper 68A controls the amount of hot air flow 18A provided to environment 66 as part of mixed flow 64, and the position of damper 68B controls the amount of cold air flow 18B provided to environment 66 as part of mixed flow 64. Environment 66 is preferably a room, hallway, building, or portion thereof or other internal environment. Air flow sensors 52A-B measure the level of air flows 18A-B and provide hot and cold flow signals representative of the level (e.g., amount in CFM) of hot air flow 18A and cold air flow 18B, respectively.

Controller 20 receives a room or zone temperature signal from a temperature sensor 50 at temperature input 54. Temperature sensor 50 is generally a resistive sensor located in environment 66. Additionally, controller 20 may be configured to receive a hot temperature signal from temperature sensor 27A at input 36A representative of the temperature of hot air flow 18A, and a cold temperature signal from temperature sensor 27B at input 36B representative of the temperature of cold air flow 18B. Also, controller 20 can be configured to receive a mixed flow signal at input 56C from mixed flow sensor 52C representative of the level of mixed flow 64. Controller 20 additionally receives a mixed temperature signal representative of temperature of mixed flow 64 at input 36C from mixed temperature sensor 27C.

Air flow sensors 52A-C are preferably differential pressure ($\Delta P$) sensors which provide a $\Delta P$ factor related to air flow (volume/unit time, e.g., CFM air flow). CFM air flow may be calculated by the following equation:)

$$CMF \text{ Air Flow} = 4005 \left( \sqrt{\frac{\Delta P}{K}} \right) \times \text{Box Area} \qquad (1)$$

where:

$\Delta P$ is the pressure drop in inches of water gauge from air flow sensors 52A-C;

Box Area is the inlet supply cross-section area in square feet; and

K is a multiplier representing the gain of the air flow pickup.

The value K and value of box area are stored in a memory (not shown in FIG. 1) in controller 20 when controller 20 is initialized or coupled with VAV box 38. The value of box area is generally in the range of 0.08 to 3.142 feet squared, and the value of K is generally between 0.58 and 13.08. Air flow sensors 52A–C are preferably diaphragm-based pressure sensors.

With reference to FIG. 1, the operation of network 10 is described as follows. Controller 20 is configured to appropriately position actuators 72A–B in accordance with a cyclically executed control algorithm. In accordance with the control algorithm, controller 20 receives the cold and hot flow signals at inputs 56A–B, the zone temperature signal at input 54, and a mixed temperature signal at input 36C. Additionally, controller 20 may receive the mixed flow signal at input 56C, the hot temperature signal at input 36A, and the cold temperature signal at input 36B, and other data (if any) from bus 32.

Controller 20 receives the flow and temperature signals every cycle of the control algorithm, preferably every 1.5 seconds. Controller 20 provides the actuator signals at actuator outputs 74A–B every cycle to accurately position dampers 68A–B so mixed flow 64 produces a comfortable (heated, cooled, or otherwise conditioned) atmosphere in environment 66. Thus, controller 20 cyclically responds to the flow signals and the temperature signals and cyclically provides the actuator signals to appropriately control internal environment 66.

Preferably, the actuator signals are pulse width modulated signals which cause actuators 72A–B to move forward, backward, or stay in the same position, and controller 20 internally keeps track of the position of actuators 72A–B as they are moved. Alternatively, actuators 72A–B may provide feedback indicative of their position, or the actuator signals may indicate the particular position to which actuators 72A–B should be moved.

Figure 2:
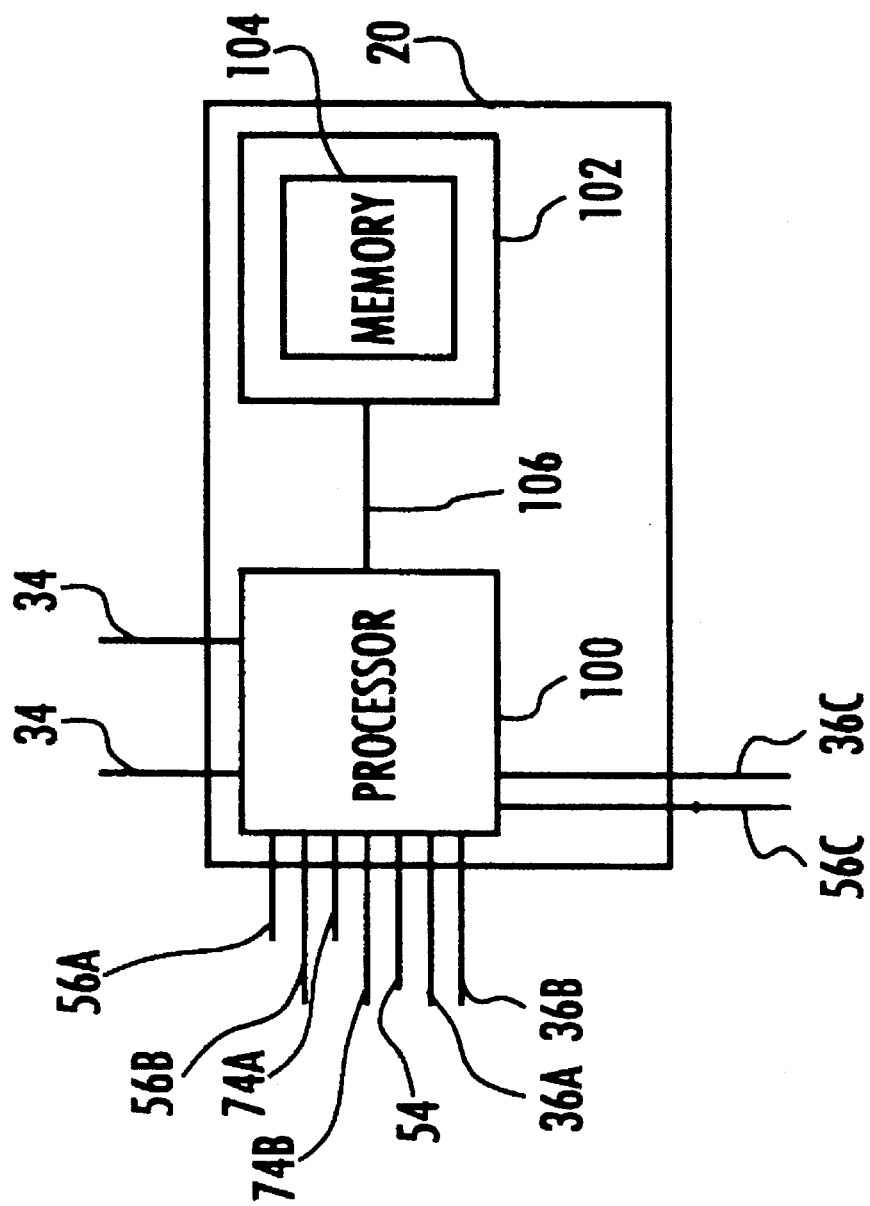
FIG. 2 is a more detailed schematic block diagram of a controller for use in the environment control system illustrated in FIG. 1.

FIG. 2 is a more detailed block diagram of controller 20 in accordance with an exemplary aspect of the present invention. Controller 20 includes a processor 100 coupled to actuator outputs 74A–B, temperature inputs 36A–C, flow inputs 56A–C, temperature input 54, and a communication port 34 which is coupled to bus 32 (FIG. 1). Processor 100 is preferably an 80C652 processor and communication port 34 is coupled with a twisted pair of conductors comprising communication bus 32 (FIG. 1).

Controller 20 also includes a memory 102. Memory 102 may be any storage device including but not limited to a disc drive (hard or floppy), a RAM, EPROM, EEPROM, flash memory, static RAM, or any other device for storing information. Memory 102 includes RAM for storing performance data in locations 104 and an EEPROM for storing instructions and the PID algorithm. Memory 100 preferably stores the control algorithm for controlling VAV box 38.

Figure 3A:
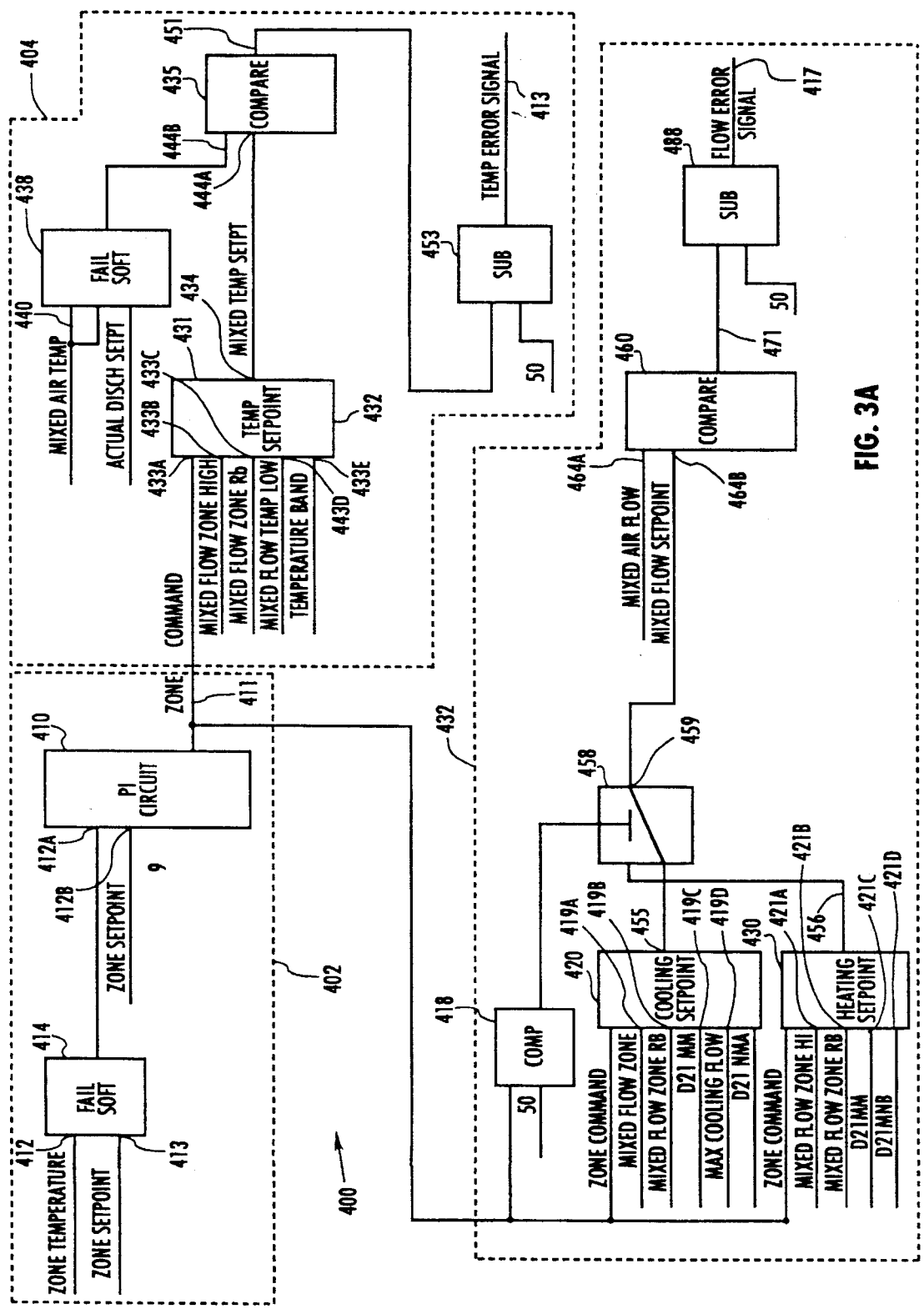
FIGS. 3A-C are block diagrams schematically illustrating the dual duct control system for use in the controller illustrated in FIG. 1.
Figure 3B:
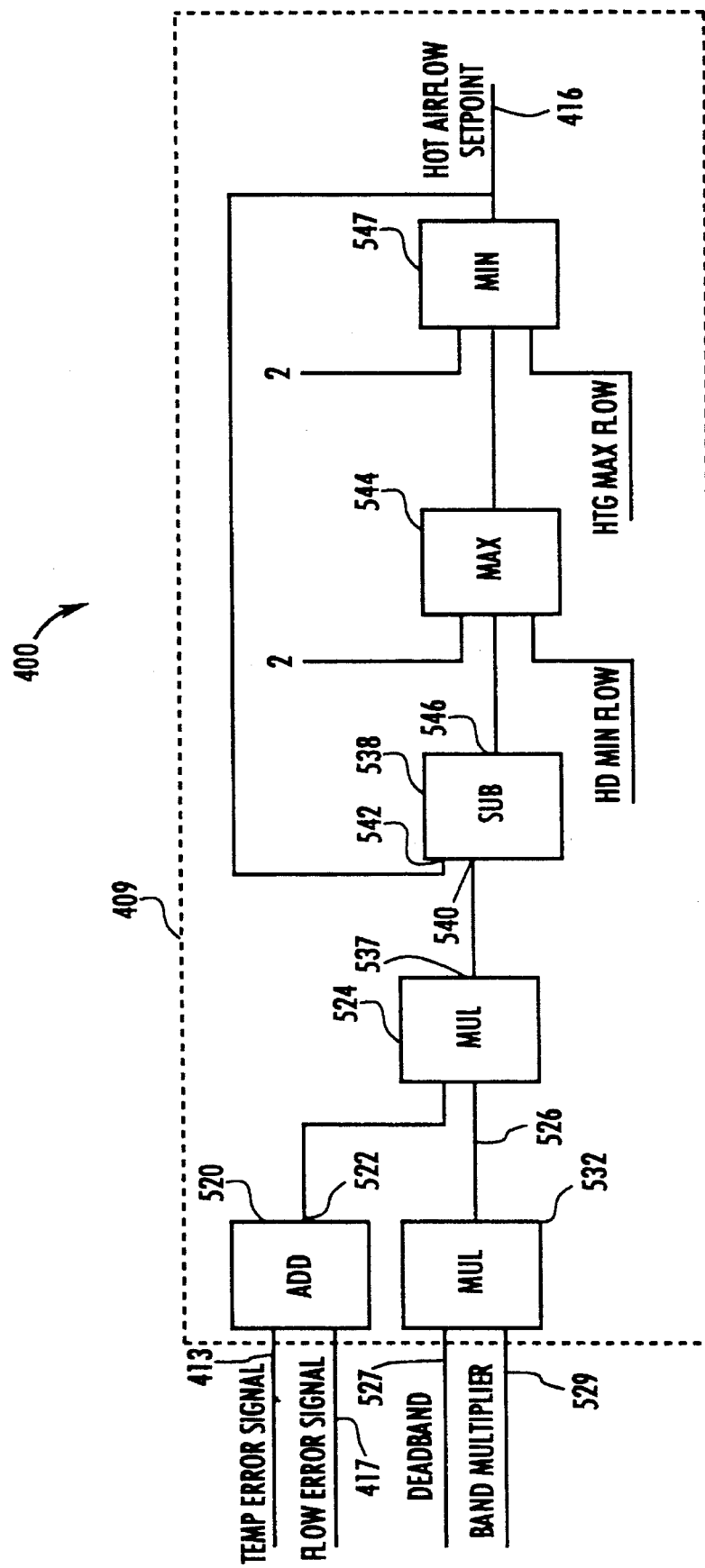
Figure 3C:
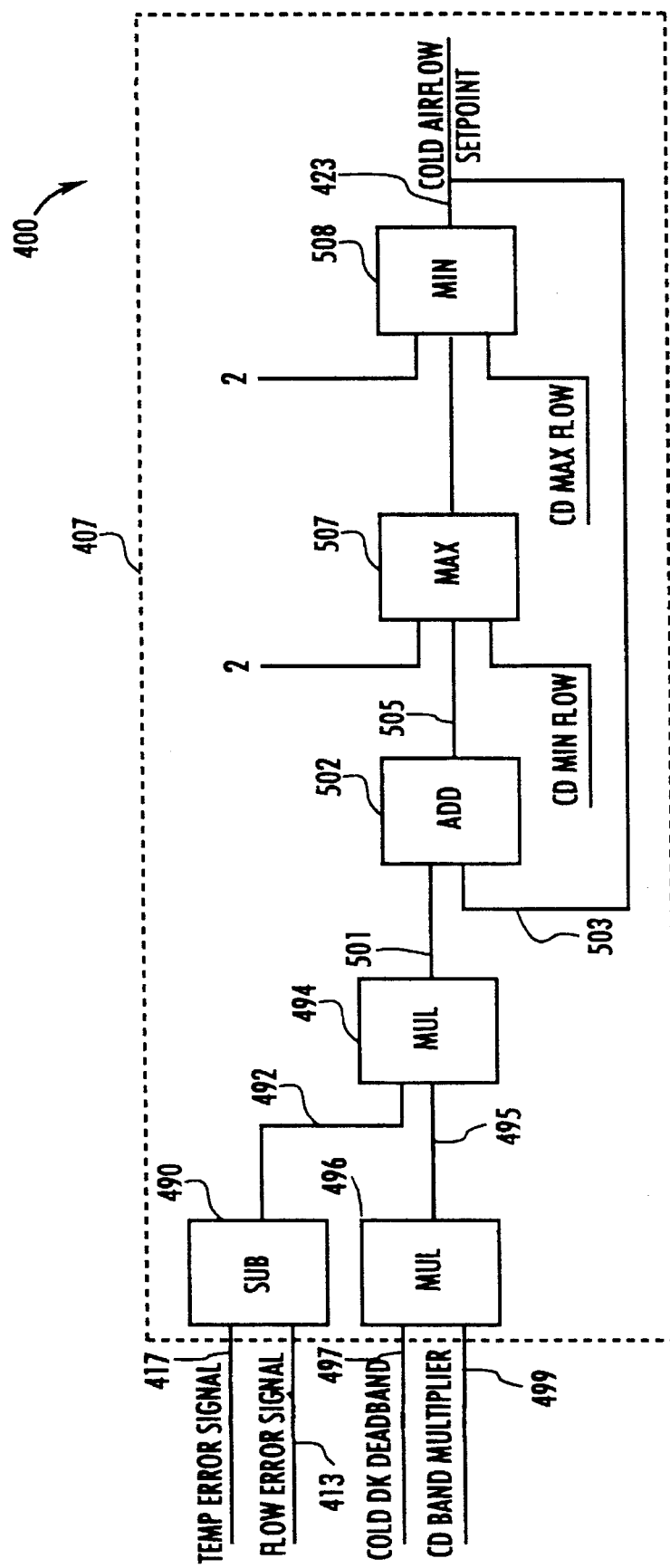

The operation of controller 20 and VAV box 38 is described in more detail below with reference to FIGS. 1–4. FIGS. 3A–C are control diagrams illustrating the operation of controller 20. Processor 100 is configured in software to be a dual duct control system 400 (FIGS. 3A–C) to advantageously control VAV box 38 so an appropriate temperature for environment 66 is quickly reached with a minimal amount of hunting.

Dual duct control system 400 (FIG. 3A) receives a zone temperature signal from sensor 50 and flow signals from sensors 52A–B and incrementally adjusts the position of actuators 72A–B. The position of actuators 72A–B and hence dampers 68A–B are adjusted in accordance with a shower algorithm embodied in system 400 so the temperature of internal environment 66 reaches and is maintained at an occupant selected temperature setpoint (e.g., a zone temperature setpoint provided by a thermostat (not shown), system 400, or other user interface).

With reference to FIGS. 3A–C, the operation of dual duct control system 400 is generally described below. Dual duct control system 400 receives a zone temperature value at an input 412 indicative of the temperature of environment 66 (e.g., the zone temperature), a mixed flow value indicative of the level of mixed flow 64 at an input 464A, and a mixed temperature value indicative of the temperature of mixed flow 64 at an input 440. The zone temperature value is derived from the temperature signal provided at input 54 from sensor 50. The mixed temperature value can be derived from the mixed temperature signal provided at input 36C by temperature sensor 27C. Alternatively, the mixed temperature value could be derived from a hot air temperature signal from temperature sensor 27A received at input 36A and a cold air temperature signal received from temperature sensor 27B at input 36B. The mixed flow value can be derived from the mixed flow signal at input 56C from mixed flow sensor 52C or can be calculated from the hot flow signal and cold flow signal at inputs 56A–B from flow sensors 52A–B, respectively (e.g., by adding the hot flow signal to the cold flow signal). Dual duct control system 400 incrementally adjusts the levels of hot air flow 18A and cold air flow 18B in response to the zone temperature value, the mixed flow temperature value, and the mixed air flow value.

Dual duct control system 400 includes a zone command circuit 402, a mixed temperature error circuit 404, a mixed flow error circuit 432, a cold flow setpoint circuit 407 (FIG. 3C), and a hot flow setpoint circuit 409 (FIG. 3B). Zone command circuit 402 provides a zone command to mixed temperature error circuit 404 at an output 411 in response to a comparison of the zone temperature value and the zone temperature setpoint. Mixed temperature error circuit 404 provides a temperature error signal at an output 413 in response to the zone command and the mixed temperature value. The temperature error signal is representative of whether the temperature of mixed flow 64 is too high, within a deadband, or too low, otherwise represented by +, 0, or –. Similarly, mixed flow error circuit 432 provides a mixed flow error signal at an output 417 in response to the zone command and mixed air flow value. The mixed flow error signal is representative of whether the level of flow associated with mixed flow 64 is too high, within a deadband, or too low, otherwise represented by +, 0, or –, respectively.

Hot flow setpoint circuit 409 (FIG. 3B) provides a new hot flow setpoint at an output 416 in response to the mixed temperature error signal and the mixed flow error signal. Similarly, cold flow setpoint circuit 407 (FIG. 3C) provides a new cold flow setpoint at an output 423 in response to the mixed temperature error signal and the mixed flow error signal. The new flow setpoints are preferably incremental changes from the previous flow setpoints. Controller 20 repositions actuators 72A–B by providing actuator control signals at outputs 74A–B so dampers 68A–B provide hot air flow 18A and cold air flow 18B in accordance with the new setpoints.

The operation of system 400 is discussed in more detail below with reference to FIG. 4. FIG. 4 illustrates an exemplary embodiment of a control algorithm for controller 20 such as shower algorithm 550. The term shower algorithm describes an incremental control system which is advantageous for controlling a system having a mixed flow output from a first source having a first quality and a second source having a second quality, such as a conventional bathroom shower.

For purposes of explanation, a bather can most efficiently obtain a comfortable shower output by incrementally adjusting the hot and cold faucets. A comfortable shower output is reached when the water flow from the shower head (e.g., the mixed flow) and the temperature of the water (e.g., the mixed temperature) are each close to a setpoint (e.g., within a deadband). If both the water flow and temperature are too low, the bather should increase only the hot water flow to most efficiently reach the setpoint. Simultaneously adjusting the cold water and hot water flow in response to the temperature of the water often causes the water flow and temperature to become unpredictable and, hence, the control of the shower output unstable. If the flow is too high and the temperature is too high, the bather should decrease only the hot water flow. If the flow is comfortable (e.g., at the setpoint) and the temperature is too low, the hot water flow should be increased and the cold water flow should be decreased. The bather should follow these guidelines until a comfortable shower environment is attained. Therefore, the shower algorithm in accordance with an exemplary aspect of the present invention provides an efficient means for bringing a mixed flow output to a comfortable setpoint.

Figure 5A:
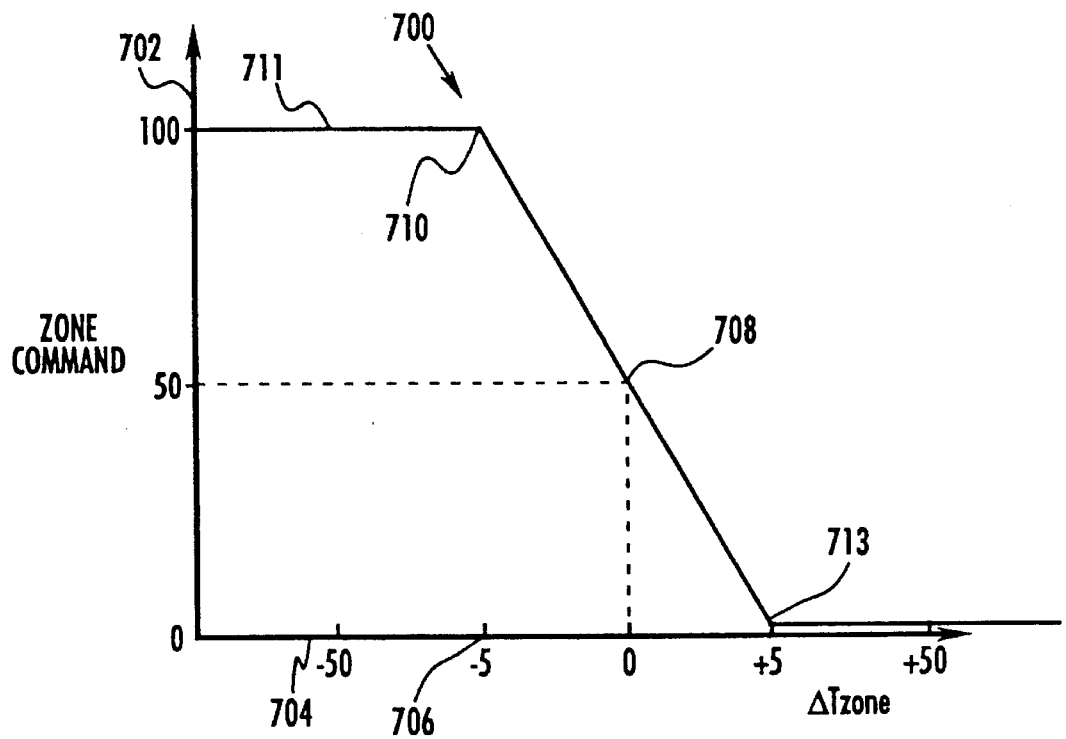
FIGS. 5A-C are graphs illustrating the calculation of mixed temperature setpoints and mixed flow setpoints for the dual duct control system illustrated in FIGS. 3A-C.

With reference to FIG. 4, shower algorithm 550 is optimized for use in control system 400. The incremental change of the hot flow setpoint is shown in a column 552 and the incremental change of the cold flow setpoint is shown in a column 554. Generally, shower algorithm 550 determines the incremental changes for the hot flow setpoint and the cold flow setpoint in response to the mixed flow error signal and the mixed temperature error signal. The mixed temperature error signal is calculated by subtracting the mixed temperature value from a mixed temperature setpoint. The mixed flow error signal is calculated by subtracting the mixed flow value from a mixed flow setpoint. The generation of the mixed flow and temperature setpoints are discussed in more detail with reference to FIGS. 5A–C.

When the temperature of mixed flow 64 is too high, within a deadband, or too low, the mixed temperature error signal is represented by a +, 0, or −, respectively. Similarly, if the flow rate of mixed flow 64 is too high, within a deadband, or too low, the mixed flow error signal is represented by +, 0, or −, respectively. If the mixed flow error is too high (+), the incremental changes to the hot and cold flow setpoints are selected from a row 560 in accordance with the mixed temperature error signal given in a column 558. If the mixed flow error is too low (−), the incremental changes are selected from a row 562 in accordance with the mixed temperature error signal given in column 558. If the mixed flow error is within a deadband (0) indicating that the mixed flow should not be adjusted, the incremental changes are selected from a row 564 in accordance with column 558. For example, if the mixed flow signal is too high (flow error signal +, row 560) and the mixed flow temperature is too hot (mixed temperature error signal +, column 558), the hot air flow setpoint is decreased (−) and the cold air flow setpoint is maintained at the same level (0). In another example, if the mixed flow error is too low (−) and the mixed temperature is too low (−), the hot air setpoint is increased (+) and the cold air setpoint is maintained (0).

Shower algorithm 550 may be stored in a look-up table in memory 102. Alternatively, the hot air and cold air setpoints may be calculated according to Equations 2 and 3, as shown as follows:

Incremental change to cold air setpoint=−[SIGN (mixed flow–mixed flow setpoint)−SIGN (mixed temperature−mixed temperature setpoint)]   (2)

Incremental change to hot air flow setpoint=−[SIGN (mixed flow–mixed flow setpoint)+SIGN (mixed temperature−mixed temperature setpoint)]   (3)

Processor 100 may advantageously calculate the incremental change in the hot flow setpoint and cold flow setpoint in accordance with Equations 2 and 3 during every cycle of the shower algorithm 550.

With reference to FIGS. 5A–C and FIGS. 3A–C, the calculation of the zone command, the mixed flow setpoint and mixed temperature setpoint and detailed operation of dual duct control system 400 is described as follows. With reference to a graph 700 in FIG. 5A, a zone command is calculated in accordance with the zone temperature measured by temperature sensor 50 by zone command circuit 402. Graph 700 includes a Y axis 702 representing a zone command from 0 to 100 and an X axis 704 representing the difference ($\Delta T_{zone}$) between the zone temperature value and the temperature setpoint ($\Delta T_{zone}$=zone temperature−temperature setpoint). The temperature setpoint is provided by a thermostat (not shown), dual duct control system 400, or other user interface.

Preferably, the zone command is 0 when the $\Delta T_{zone}$ is less than or equal to −5 at a point 710. The zone command is equal to 50 at a point 708 when the $\Delta T_{zone}$ is equal to 0, and the zone command is equal to 0 at a point 713 when $\Delta T_{zone}$ is greater than or equal to +5. Processor 100 (FIG. 2) receives the zone temperature signal from sensor 50 at input 54 and generates the zone temperature value. The zone temperature value is provided to dual duct control system 400 at an input 412 of a fail soft circuit 414.

Circuit 414 provides the actual zone temperature value to an input 412A of a zone circuit 410 when sensor 50 is working properly. If sensor 50 provides a zone temperature signal outside a predetermined operational band, fail soft circuit 414 assumes that sensor 50 is not operating properly and provides the zone temperature setpoint received at an input 413 to input 412A of zone circuit 410.

Zone circuit 410 generates the zone command in accordance with graph 700 by comparing the actual zone temperature value received at an input 412A with the zone temperature setpoint received at an input 412B. System 400 may be configured for different shapes and intercepts for graph 700. Zone circuit 410 provides the zone command to temperature error circuit 404 and flow error circuit 432.

Figure 5B:
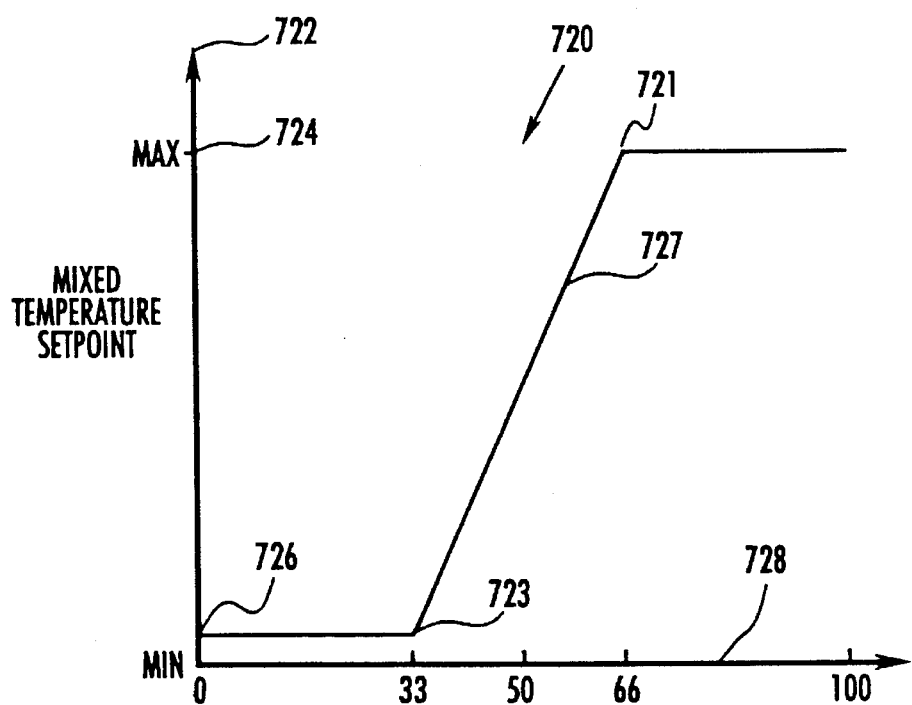

The calculation of the mixed temperature error signal in response to the zone command at output 411 by temperature error circuit 404 is discussed in more detail below with reference to FIG. 5B. A graph 720 includes a Y axis 722 representing the mixed temperature setpoint and an X axis 728 representing the zone command from 0–100. The mixed temperature setpoint includes a maximum value 724 which is the temperature of hot air flow 18A, preferably 115° F., and a minimum value 726 which is the temperature of cold air flow 18B, preferably 55° F. Zone commands of 0–33 correspond to minimum value 726 for the mixed temperature setpoint, and zone commands of 66–100 correspond to maximum value 724 for the mixed temperature setpoint. Zone commands from 33–66 are linearly related to the mixed temperature setpoints between minimum value 726 and maximum value 724 as shown in section 727 of graph 720.

A temperature setpoint circuit 431 in circuit 404 (FIG. 3A) receives the zone command at an input 433A and generates the mixed temperature setpoint at an output 434 in accordance with graph 720. System 400 may be configured for different shapes, slopes, and intercepts for graph 720. For example, an input 433B allows a point 721 along axis 728 to be set with respect to the zone command. Additionally, an input 433C allows the width across zone commands of section 727 to be set, an input 433D allows minimum value 726 to be set, and an input 433E allows the range of temperature values from maximum value 724 to minimum value 726 to be set. A compare circuit 435 receives the mixed temperature setpoint at an input 444A from output 434 and receives the actual mixed temperature at an input 444B from fail soft circuit 438.

Fail soft circuit 438 operates similarly to fail soft circuit 414 and provides the mixed temperature value derived from the mixed temperature signal received at input 56C of controller 20. Processor 100 provides the mixed temperature value to an input 440 of fail soft circuit 438.

Compare circuit 435 is configured to provide a signal equal to 0, 50, or 100 at an output 451 in response to the mixed temperature setpoint at input 444A and the actual mixed temperature value at input 444B. If the difference ($\Delta T_{mixed}$) between the mixed temperature setpoint at input 444B and the mixed temperature value at input 444A ($\Delta T_{mixed}$=mixed temperature value–mixed temperature setpoint) is within a deadband such as 0.5 degrees, compare circuit 435 provides a value of 50 at output 451. If $\Delta T_{mixed}$ is less than 0 and outside the deadband, compare circuit 435 provides a 0 at output 451. If $\Delta T_{mixed}$ is greater than 0 and outside the deadband, compare circuit 435 provides an output of 100. Subtract circuit 453 subtracts the value 50 from the value at output 451, thereby providing a value of −50, 0 or 50 at an output 413. The value −50, 0 or 50 is representative of the sign of the temperature error associated with mixed flow 64. The value −50, 0, or 50 is the mixed temperature error signal and is represented as −, 0, and +, respectively, in FIG. 4.

Figure 5C:
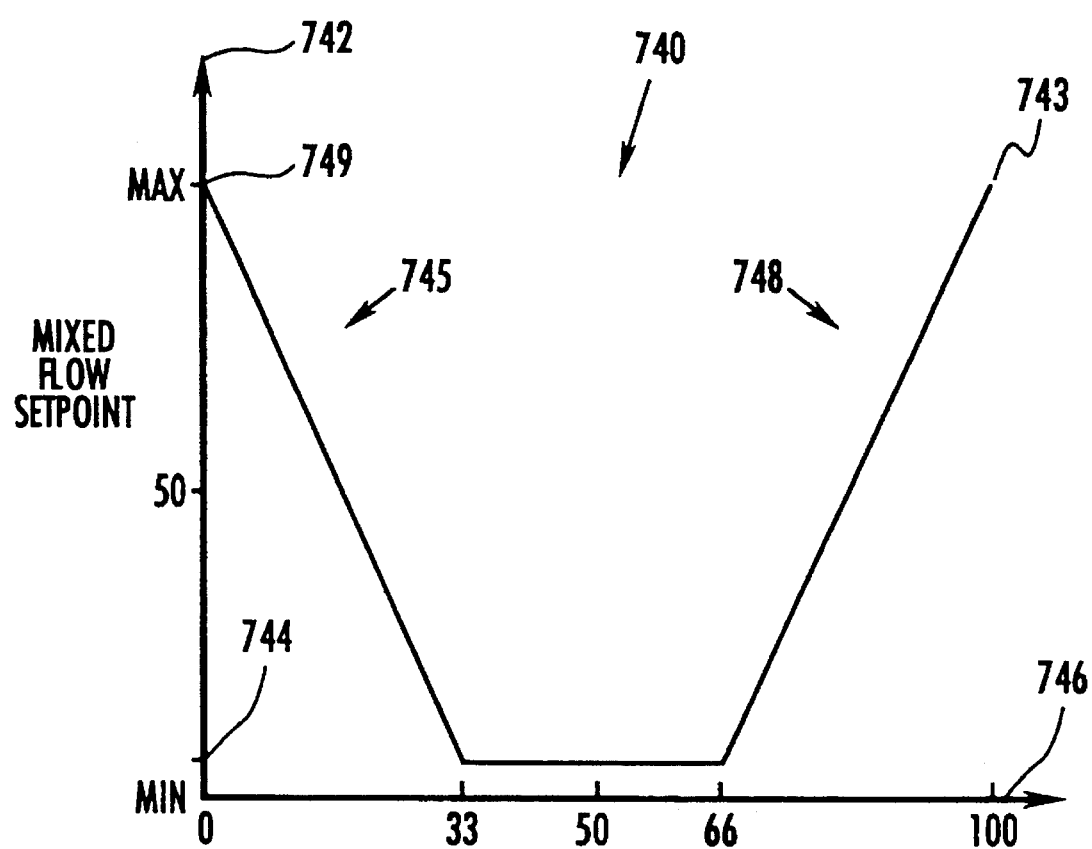

Mixed flow error circuit 432 (FIG. 3A) receives zone command at output 411 and generates the mixed flow error signal at output 417 in response to the mixed flow setpoint and the mixed flow value. With reference to FIG. 5C, the mixed flow setpoint is generated in accordance with a graph 740 by setpoint circuits 420 and 430. Graph 740 has a Y axis 742 representing the mixed flow setpoint and an X axis 746 representing the zone command from 0 to 100.

The mixed flow setpoint is between a cooling maximum 749 (e.g., 500 CFM) and a minimum value 744 (e.g., 100 CFM), or between a heating maximum 743 (e.g., 400 CFM) and minimum value 744. If the zone command is between 33 and 66, the mixed flow setpoint is set to minimum value 744. If the zone command is between 66 and 100, the mixed flow setpoint is set between heating maximum 743 and minimum value 744 from a section 748 of graph 740. Heating maximum 743 is the maximum air flow which can be provided by hot air flow 18A. If the zone command is between 33 and 0, the mixed flow setpoint is between cooling maximum 749 and minimum value 744 from a section 745 of graph 740. Heating maximum 749 is the maximum air flow which can be provided by cold air flow 18B. Cooling maximum 749 and heating maximum 743 may be different values.

Mixed flow error circuit 432 includes a cooling setpoint circuit 420 and a heating setpoint circuit 430. A comparator 418 causes a circuit 458 to choose the mixed flow setpoint from circuit 420 when the zone command is less than 50. Comparator 418 causes circuit 458 to choose the mixed flow setpoint from circuit 430 when the zone command is greater than or equal to 50.

Cooling setpoint circuit 420 receives the zone command and provides the mixed flow setpoint at an output 455. The mixed flow setpoint from circuit 420 is chosen by a circuit 458 when the zone command is less than 50 indicating that environment 66 should be cooled. If the zone command is between 0 and 33, the mixed flow setpoint provided by circuit 420 from section 745 of graph 740. If the zone command is between 33 and 50, the mixed flow setpoint is minimum value 744 in accordance with graph 740. The mixed flow setpoint is provided at an output 455 to circuit 458.

Similarly, heating setpoint circuit 430 provides mixed flow setpoint in accordance with graph 740 if the zone command is between 50 and 100, indicating that environment 66 should be heated. If the zone command is between 50 and 66, circuit 430 sets the mixed flow setpoint to minimum value 744. If the zone command is between 66 and 100, the mixed flow setpoint is chosen from section 748 of graph 740. The mixed flow setpoint is provided at an output 456 to circuit 458.

System 400 may be configured for different shapes, slopes, and intercepts for graph 720. For example, an input 419A allows the zone command for cooling maximum 743 to be set, and an input 421A allows the zone command for heating maximum 749 to be set. Also, inputs 419B and 421B allow the width across zone commands of sections 745 and 748 to be set, respectively. Additionally, inputs 419C and 421C allow minimum value 744 to be set, and inputs 421D and 419D allow cooling maximum 749 and heating maximum 743 to be set, respectively. Thus, the shapes of graphs 700, 720 and 740 for providing the zone command, mixed temperature setpoint, and mixed flow setpoint may be arranged in a variety of configurations. For example, the zone command may relate to $\Delta T_{zone}$ in other manners such as a non-linear relationship or a larger linear response. As another example, the zone command can linearly relate to $\Delta T_{zone}$ for values of −10 to +10. Additionally, graphs 720 and 740 may be adjusted to provide different relationships to the zone command.

The mixed flow setpoint is provided at an output 459 to a compare circuit 460. Compare circuit 460 receives the mixed flow value at an input 464B. The mixed flow value is generated by processor 100 in response to the hot flow and cold flow signals at inputs 56A and B or from the mixed flow signal from input 56C. Processor 100 provides the mixed flow value (e.g., actual mixed flow value) to an input 464A of a comparator circuit 460.

Compare circuit 460 is configured to provide a signal or value equal to 0, 50 or 100 in response to the mixed flow value at input 464A and mixed flow setpoint at an input 464B. If the difference ($\Delta P_{mixed}$) between the mixed flow value and mixed flow setpoint ($\Delta P_{mixed}$=P actual–P setpoint) is within a deadband such as 35 CFM, comparator circuit 460 provides a value of 50 at an output 471. If $\Delta P_{mixed}$ is less than 0 and outside the deadband, comparator circuit 460 provides a value of 0 at output 471. If $\Delta P_{mixed}$ is greater than 0 and outside the deadband, comparator circuit 460 provides a value of 100 at output 471. Subtract circuit 488 subtracts the value 50 from the value at output 471, thereby providing a value of −50, 0, or 50 at an output 417. The value −50, 0, or 50 is representative of the sign of the flow error associated with mixed flow 64. The value −50, 0, or 50 is the mixed flow error signal and is represented as −, 0, and +, respectively, in FIG. 4.

The mixed flow error signal at output 417 and the mixed temperature error signal at output 413 are provided to cold flow setpoint circuit 407 (FIG. 3C) and hot flow circuit 409 (FIG. 3B). Circuits 407 and 409 generally implement Equations 2 and 3 discussed above with respect to the shower algorithm to provide new hot and cold flow setpoints so controller 20 may reposition actuators 72A–B. Alternatively, circuits 407 and 409 may implement a double increment scheme so that the cold air flow setpoint and hot air flow setpoint may be incremented or decremented by two in situations where both the mixed flow and temperature error signals have the same error to more quickly adjust the temperature and flow of mixed flow 64.

The operation of cold flow setpoint circuit 407 is discussed in detail below (FIG. 3C). A subtract input 490 subtracts the flow error signal from the temperature error signal and provides the difference at an output 492. A multiplier 494 multiplies the difference with an incremental value received at an input 495. A multiplier 496 generates the incremental value in accordance with a cold deadband input 497 and a cold band multiplier 499. Inputs 497 and 499 are user selectable and allow the incremental value to be adjusted to optimize the control of internal environment 66. Multiplier 494 provides the product (e.g., the incremental adjustment) at an output 501.

An add circuit 502 adds the previous cold flow setpoint at an input 503 with the product provided at output 501. The sum is provided by add circuit 502 at an output 505 to a maximum circuit 507. Maximum circuit 507 provides the sum to a minimum circuit 508 which provides the sum to output 423 as the new cold flow setpoint. Circuits 507 and 508 ensure that the new cold flow setpoint is within an operating range (e.g., not out of bounds) During the next cycle of the control algorithm, controller 20 positions actuator 72B via the actuator signal at output 74B so that damper 68B provides the appropriate cold air flow 18B in accordance with the new cold air setpoint.

The operation of hot flow setpoint circuit 409 is discussed in detail below (FIG. 3B). An add circuit 520 adds the mixed temperature error signal and the mixed flow error signal and provides the sum at an output 522. A multiplier 524 multiplies the sum with an incremental value received at an input 526. A multiplier 532 generates the incremental value in accordance with a hot deadband input 527 and a hot band multiplier input 529. Inputs 527 and 529 are user selectable and allow the incremental value to optimize the control of internal environment 66.

Multiplier 524 provides the product (e.g., the incremental adjustment) at an output 537. A subtract circuit 538 subtracts the product at an input of 540 from the previous hot flow setpoint at an input 542. The difference is provided by subtract circuit 538 at an output 546 to a maximum circuit 544. Maximum circuit 544 provides the sum to a minimum circuit 547 which provides the sum to an output 416 as the new hot flow setpoint. During the next cycle of the control algorithm, controller 20 positions actuator 72A via the actuator signal at output 74A so damper 68A provides the appropriate hot air flow 18A in accordance with the new hot air flow setpoint. Maximum circuit 544 and minimum circuit 546 ensure that the hot flow setpoint is within an operating range.

Controller 20 is configured by software written in "C" computer language for a PC/AT computer. Exemplary pseudocode software is attached hereto in microfiche Appendix A. The pseudocode software shows an exemplary embodiment of a dual duct control system 400. Processor 100 in controller 20 is configured as dual duct control system 400 in response to the pseudocode software in microfiche Appendix A. Alternatively, a hardware control circuit or other software may be utilized to implement the shower algorithm in accordance with an exemplary aspect of the present invention.

It is understood that, while the detailed drawings and specific examples given describe a preferred exemplary embodiment of the present invention, they are for the purpose of illustration only. The invention is not limited to the precise details and conditions disclosed. For example, although a particular environment control network is discussed, other control systems may be utilized for other applications such as boilers, chemical process, manufacturing process, or other uses which have at least two inputs having two qualities. Also, although particular facility management systems and components are suggested, the performance monitor system may be configured for various other HVAC systems. Also, single lines in the various Figures may represent multiple conductors. Various changes may be made to the details disclosed without departing from the spirit of the invention which is defined by the following claims.

We claim:

1. In an environment control system including a first duct for providing hot air and a second duct for providing cold air, a flow sensor circuit configured to determine combined flow of the hot air and the cold air and to provide a mixed flow signal representative of the combined flow, and a temperature sensor configured to measure temperature of the combined flow and to provide a temperature signal representative of the temperature, a dual duct control system, comprising:

a controller configured to individually control a hot flow of the hot air provided by the first duct and to individually control a cold flow of the cold air provided by the second duct, the controller comprising:

a zone command circuit providing a zone command responsive to a zone temperature set point and a zone temperature value;

a mixed temperature error circuit coupled to the zone command circuit providing a mixed temperature error signal responsive to the zone command and the temperature signal;

a mixed flow error circuit coupled to the zone command circuit providing a mixed flow error signal responsive to the zone command and the mixed flow signal;

a cold flow setpoint circuit coupled to the mixed temperature error circuit and the mixed flow error circuit providing a cold flow setpoint for controlling the cold flow responsive to the mixed temperature error signal and the mixed flow error signal; and a hot flow setpoint circuit circuit coupled to the mixed temperature error circuit and the mixed flow error circuit providing a hot flow setpoint for controlling the hot flow responsive to the mixed temperature error signal and the mixed flow error signal.

2. The control system of claim 1 wherein the zone command is a function of a zone setpoint and a zone value.

3. The control system of claim 1 wherein the mixed temperature error circuit is operable to determine a mixed temperature setpoint and to provide the mixed temperature error signal as a function of the mixed temperature setpoint and the temperature signal.

4. The control system of claim 3 wherein the mixed temperature setpoint is determined responsive to the zone command.

5. The control system of claim 1 wherein the mixed flow error circuit is operable to determine a mixed flow setpoint and to provide the mixed flow error signal as a function of the mixed flow setpoint and the mixed flow signal.

6. The control system of claim 5 wherein the mixed flow setpoint is determined responsive to the zone command.

7. The control system of claim 1 wherein the hot flow setpoint and the cold flow setpoint are incremental adjustments from a previous hot flow setpoint and a previous cold flow setpoint, respectively.

8. The control system of claim 1 wherein the cold flow setpoint is a function of a difference between the mixed temperature error signal and the mixed flow error signal.

9. The control system of claim 1 wherein the hot flow setpoint is a function of a sum of the mixed temperature error signal and the mixed flow error signal.

10. In an environment control system including a first duct for providing a hot air flow and a second duct for providing a cold air flow, a flow sensor circuit configured to determine a combined flow of the hot air flow and the cold air flow and to provide a mixed flow signal representative of the combined flow, and a temperature sensor configured to measure a temperature of the combined flow and to provide a temperature signal representative of the temperature, a method of controlling an environmental zone comprising:

providing a zone command responsive to a zone temperature set point and a zone temperature value;

determining a mixed temperature error responsive to the zone command and the temperature signal;

determining a mixed flow error responsive to the zone command and the mixed flow signal;

adjusting the cold flow responsive to the mixed temperature error signal and the mixed flow error signal; and adjusting the hot flow responsive to the mixed temperature error signal and the mixed flow error signal.

11. The method of claim 10 wherein the step of providing a zone command comprises determining the zone command as a function of a zone setpoint and a zone value.

12. The method of claim 10 wherein the step of determining a mixed temperature error comprises determining a mixed temperature setpoint and determining the mixed temperature error as a function of the mixed temperature setpoint and the temperature signal.

13. The method of claim 12 wherein the step of determining the mixed temperature setpoint comprising determining the mixed temperature setpoint in response to the zone command.

14. The method of claim 10 wherein the step of determining a mixed flow error comprises determining a mixed flow setpoint and determining the mixed flow error as a function of the mixed flow setpoint and the mixed flow signal.

15. The method of claim 14 wherein the step of determining the mixed flow setpoint comprising determining the mixed flow setpoint in response to the zone command.

16. The method of claim 10 further comprising the step of determining a hot flow setpoint and a cold flow setpoint as an incremental adjustment from a previous hot flow setpoint and a previous cold flow setpoint, respectively.

17. The method of claim 16 wherein the step of determining a cold flow setpoint comprises determining the cold flow setpoint as a function of a difference between the mixed temperature error signal and the mixed flow error signal.

18. The method of claim 16 wherein the step of determining a hot flow setpoint comprises determining the hot flow setpoint as a function of a sum of the mixed temperature error signal and the mixed flow error signal.

* * * * *